United States Patent
Abbeloos et al.

(10) Patent No.: US 12,073,322 B2
(45) Date of Patent: Aug. 27, 2024

(54) COMPUTER-IMPLEMENTED TRAINING METHOD, CLASSIFICATION METHOD AND SYSTEM AND COMPUTER-READABLE RECORDING MEDIUM

(71) Applicants: Toyota Jidosha Kabushiki Kaisha, Toyota Aichi-ken (JP); Katholieke Universiteit Leuven, Leuven (BE)

(72) Inventors: Wim Abbeloos, Hove (BE); Gabriel Othmezouri, Ixelles (BE); Wouter Van Gansbeke, Dilbeek (BE); Simon Vandenhende, Leuven (BE); Marc Proesmans, Lede (BE); Stamatios Georgoulis, Zurich (CH); Luc Van Gool, Zurich (CH)

(73) Assignees: TOYOTA JIDOSHA KABUSHIKI KAISHA, Toyota Aichi-ken (JP); KATHOLIEKE UNIVERSITEIT LEUVEN, Leuven (BE)

( * ) Notice: Subject to any disclaimer, the term of this patent is extended or adjusted under 35 U.S.C. 154(b) by 597 days.

(21) Appl. No.: 17/327,030

(22) Filed: May 21, 2021

(65) Prior Publication Data
US 2021/0365735 A1 Nov. 25, 2021

(30) Foreign Application Priority Data
May 22, 2020 (EP) .................................... 20176143

(51) Int. Cl.
*G06N 3/08* (2023.01)
*G06F 18/10* (2023.01)
(Continued)

(52) U.S. Cl.
CPC ............... *G06N 3/08* (2013.01); *G06F 18/10* (2023.01); *G06F 18/2148* (2023.01); *G06F 18/23* (2023.01); *G06F 18/24137* (2023.01)

(58) Field of Classification Search
CPC . G06N 3/08; G06F 18/24137; G06F 18/2148; G06F 18/10; G06F 18/23
See application file for complete search history.

(56) References Cited

U.S. PATENT DOCUMENTS 9,015,093 B1 * 4/2015 Commons .......... G01C 21/3602
706/26
2010/0158359 A1 * 6/2010 Qiao ...................... G06K 15/02
382/164

(Continued)

OTHER PUBLICATIONS

Ji, Xu et al., "Invariant Information Clustering for Unsupervised Image Classification and Segmentation", IEEE/CVF International Conference on Computer Vision (ICCV), IEEE, Oct. 27, 2019, p. 9864-9873. (cited in specification).

(Continued)

*Primary Examiner* — Qun Shen
(74) *Attorney, Agent, or Firm* — Dinsmore & Shohl LLP (57) ABSTRACT

A computer-implemented method for training a classifier ($\Phi\eta$), including: training a pretext model ($\Phi\Theta$) to learn a pretext task, so as to minimize a distance between an output of a source sample via the pretext model ($\Phi\Theta$) and an output of a corresponding transformed sample via the pretext model ($\Phi\Theta$), the transformed sample being a sample obtained by applying a transformation (T) to the source sample; S20) determining a neighborhood (NXi) of samples (Xi) of a dataset (SD) in the embedding space; S30) training the classifier ($\Phi\eta$) to predict respective estimated probabilities $\Phi\eta j(Xi)$, $j=1\ldots C$, for a sample (Xi) to belong to respective clusters (Cj), by using a second training criterion which tends to: maximize a likelihood for a sample and its neighbors (Xj) of its neighborhood (Nxi) to belong to the same cluster; and force the samples to be distributed over several clusters.

20 Claims, 4 Drawing Sheets (51) Int. Cl.
    *G06F 18/214*     (2023.01)
    *G06F 18/23*     (2023.01)
    *G06F 18/2413*     (2023.01)

(56) References Cited

U.S. PATENT DOCUMENTS

| | | | | |
|---|---|---|---|---|
| 2013/0144818 | A1* | 6/2013 | Jebara | G06Q 50/00 706/12 |
| 2019/0311301 | A1* | 10/2019 | Pyati | G06F 16/901 |
| 2019/0377819 | A1* | 12/2019 | Filliben | G06N 3/084 |
| 2019/0378010 | A1* | 12/2019 | Morris | G06F 16/288 |
| 2019/0378049 | A1* | 12/2019 | Widmann | G06Q 20/4016 |
| 2021/0241921 | A1* | 8/2021 | Neumann | G16H 50/70 |
| 2021/0312611 | A1* | 10/2021 | Neumann | G16H 50/30 |
| 2021/0343407 | A1* | 11/2021 | Neumann | G06N 3/00 |

OTHER PUBLICATIONS

Peng, Jizong et al., "Information based Deep Clustering: An experimental study", arxiv.org, Cornell University Library, 201 Olin Library Cornell Univeristy Ithaca, NY, 14853, Oct. 3, 2019.

Huang, Jiabo et al., "Unsupervised Deep Learning by Neighbourhood Discovery", arxiv.org, Cornell University Library, 201 Olin Library Cornell University Ithaca, NY 14853, Apr. 25, 2019.

Gidaris, Spyros et al., "Unsupervised Representation Learning by Predicting Image Rotations", ICLR, 2018, p. 1-16. (cited in specification).

Wu, Zhirong et al., "Unsupervised Feature Learning via Non-Parametric Instance Discrimination", CVPR 2018, p. 3733-3742. (cited in specification).

Chang, Jianlong et al., "Deep Adaptive Image Clustering", ICCV, 2017, p. 5879-5887. (cited in specification).

Misra, Ishan et al., "Self-Supervised Learning of Pretext-Invariant Representations", arXiv preprint arXiv:1912.01991, 2019, p. 1-14. (cited in specification).

Gutmann, Michael, et al., "Noise-contrastive estimation: A new estimation principle for unnormalized statistical models", Proceedings of the Thirteenth International Conference on Artificial Intelligence and Statistics, PMLR 9, 2010, p. 297-304. (cited in specification).

Devries, Terrance et al., "Improved Regularization of Convolutional Neural Networks with Cutout", arXiv preprint arXiv: 1708.04552, 2017. (cited in specification).

Cubuk, Ekin D., et al., "RandAugment: Practical automated data augmentation with a reduced search space", arXiv:1909.13719. (cited in specification).

Jing Longlong et al.: "Self-Supervised Visual Feature Learning With Deep Neural Networks: A Survey", IEEE Transactions On Pattern Analysis and Machine Intelligence, IEEE Computer Society, USA, vol. 43, No. 11, May 4, 2020 (May 4, 2020), pp. 4037-4058.

Kemsaram Narsimlu et al.: "An Integrated Framework for Autonomous Driving: Object Detection, Lane Detection, and Free Space Detection", 2019 Third World Conference On Smart Trends in Systems Security and Sustainablity (WORLDS4), IEEE, Jul. 30, 2019 (Jul. 30, 2019), pp. 260-265.

Mehdi Noroozi et al.: "Boosting Self-Supervised Learning via Knowledge Transfer", Arxiv.Org, Cornell University Library, 201 Olin Library Cornell University Ithaca, NY 14853, May 1, 2018 (May 1, 2018).

\* cited by examiner

COMPUTER-IMPLEMENTED TRAINING METHOD, CLASSIFICATION METHOD AND SYSTEM AND COMPUTER-READABLE RECORDING MEDIUM

CROSS-REFERENCE TO RELATED APPLICATION

This application claims priority to European Patent Application No. 20176143.4 filed on May 22, 2020, incorporated herein by reference in its entirety.

TECHNICAL FIELD

The present disclosure concerns training methods to learn a parametric model for classifying images, or more generally samples, without using ground-truth annotations.

BACKGROUND ART

Artificial neural networks are able to extract information from large scale datasets. Increasing the amount of training data, generally improves their performance and robustness.

As a consequence of this evolution, the training datasets needed to train neural networks have grown exponentially over the past few years. Consequently, there is a growing need to train neural networks fully, or at least partly, in an unsupervised manner, so as to reduce the need for ground truth annotations. This need concerns in particular classification neural networks used to classify samples (input data) between a certain number of classes.

Two families of methods have already been proposed to perform unsupervised learning.

Representation learning methods use self-supervised learning to generate feature representations, solely from the images, using pre-designed tasks, called pretext tasks. Then, a second step for fine-tuning the parameters of the network is performed, based on another task. Unfortunately, this second step requires an annotated dataset (i.e., ground-truth data). As an alternative, if such annotated dataset is not available to carry out the second step, an offline clustering technique like K-means can be applied to the learned feature representations. However, this can lead to cluster degeneracy, and there is no guarantee that the obtained clusters are semantically meaningful.

A second family of methods comprises end-to-end learning pipelines, which combine feature learning with clustering. However, many of these methods either are sensitive to initialization conditions, and/or are prone to converge towards degenerate solutions.

REFERENCES

[1] Gidaris, S., Singh, P., Komodakis, N.: Unsupervised representation learning by predicting image rotations. In: ICLR (2018)
[2] Wu, Z., Xiong, Y., Yu, S. X., Lin, D.: Unsupervised feature learning via non-parametric instance discrimination, in CVPR 2018.
[3] Chang, J., Wang, L., Meng, G., Xiang, S., Pan, C.: Deep adaptive image clustering, in ICCV (2017).
[4] Ji, X., Henriques, J. F., Vedaldi, A.: Invariant information clustering for unsupervised image classification and segmentation. In: ICCV (2019).
[5] Misra, I., van der Maaten, L.: Self-supervised learning of pretext-invariant representations. arXiv preprint arXiv: 1912.01991 (2019).
[6] Michael Gutmann, Aapo Hyvärinen: Noise-contrastive estimation: A new estimation principle for unnormalized statistical models. Proceedings of the Thirteenth International Conference on Artificial Intelligence and Statistics, PMLR 9:297-304, 2010.
[7] DeVries Terrance, and Graham W. Taylor: "Improved regularization of convolutional neural networks with cutout." arXiv preprint arXiv:1708.04552 (2017).
[8] Ekin D. Cubuk, Barret Zoph, Jonathon Shlens, Quoc V. Le.: "RandAugment: Practical automated data augmentation with a reduced search space", arXiv:1909.13719.

SUMMARY

In view of the deficiencies of existing methods, a first purpose of the present disclosure is to propose a training method to learn a parametric model for classifying samples, in fully or at least largely unsupervised mode, which does not depend on initialization conditions, and which exhibits high performance in the classification task.

Therefore, a computer-implemented training method for training a classifier is proposed.

Herein, a transformed sample is a sample obtained by applying a transformation (noted T) to a source sample, where the source sample is a datum of a source dataset.

The training method comprises:

S10) training a pretext model ($\Phi\Theta$) to learn a pretext task, based on the source dataset (SD), by using a first training criterion which tends to minimize, across the source samples of the source dataset, a distance between an output of a source sample via the pretext model ($\Phi\Theta$) and an output of a corresponding transformed sample via the pretext model ($\Phi\Theta$);

S20) for at least one sample among the samples (Xi) of the source dataset (SD), determining a neighborhood (NXi) of said at least one sample (Xi);

wherein for said at least one sample, the neighborhood (NXi) of said at least one sample (Xi) comprises K closest neighbors of the sample (Xi), K being an integer, K>=1, said K closest neighbors of the sample (Xi) being K samples Xj of the dataset having smallest distances between $\Phi\Theta$ (Xi) and $\Phi\Theta$ (Xj);

S30) training the classifier ($\Phi\eta$) to predict respective estimated probabilities $\Phi\eta j$(Xi), j=1 ... C, for a sample (Xi) to belong to respective clusters (Cj), by using a second training criterion which:

tends to maximize a likelihood for a sample and a neighbor (Xj) of the sample (Xi) belonging to the neighborhood (Nxi) of the sample to belong to the same cluster; and tends to force the samples to be distributed over a plurality of clusters.

In the above presentation, a transformed sample, also called an augmentation, of a source sample Xi is a sample T(Xi) obtained by applying a transformation T to the source sample; which transformation modifies the source sample without destroying (or without excessively destroying) its semantic content. Augmentations customarily used by data scientists to increase the size of their datasets can be obtained for instance by applying a rotation, a jitter, a crop, etc., to the source sample, when the source sample is an image.

Since the first training criterion includes terms based on an output of a source sample via the pretext model ($\Phi\Theta$) and an output of a corresponding transformed sample via the pretext model ($\Phi\Theta$), one understands that the dataset used at step S10 comprises not only the sources samples of the source dataset, but also transformed samples obtained by applying a transformation to one of these source samples.

A classifier is a parametric model, or function, implemented by a program executed by a computer. A classifier can be implemented in particular by an artificial neural network. The word 'computer' encompasses herein any form of data processing system, comprising one or more processing units in one or more locations, configured to process data together so as to provide an output. It can be for instance a personal computer, a smartphone, a cluster of servers located in different locations, a processing unit of any device (for instance a 'smart oven'), having some data processing capability, etc.

A sample is any datum of information. It can be for instance an image, but it can also be very broadly any kind of datum of information, for instance an audio or video recording, a text passage, a 3D pointcloud, etc. It can also combine a plurality of data.

The sample can be an 'initial image' as outputted by a camera. It can also be any image based on such an initial image, and obtained by applying a pre-processing to the initial image. The sample can be for instance a sub-image of the initial image.

In the present document, a sub-image of an initial image is an image which is obtained by cropping the initial image, and therefore comprises fewer lines and/or fewer columns than the initial image.

The number ('C') of probabilities determined by the classifier is the number of coordinates of the vector of probabilities outputted by the classifier. This number C can be seen as a number C of clusters Cj, with j ranging from 1 to C. The coordinates $\Phi\eta^j(Xi)$ (j=1 . . . C) therefore constitute a prediction, made by the classifier, which contains the respective estimated probabilities for the sample Xi to belong to respective clusters Cj. Accordingly, the function of the classifier is to classify the samples in the respective clusters, i.e. to perform a clustering function.

In the above definition, the indication that the second training criterion "tends to maximize a likelihood for a sample and a neighbor (Xj) of the sample (Xi) belonging to the neighborhood (Nxi) of the sample to belong to the same cluster" means that the second training criterion is configured in such way that when the classifier $\Phi\eta$ is trained at step S30, the weights q of the classifier are set so as to maximize a likelihood for a sample and its neighbors (Xj) of its neighborhood (Nxi) to belong to the same cluster.

For a sample, the highest prediction for the sample, which is the highest coordinate of the prediction vector $\Phi\eta(Xi)$, is called $\Phi\eta^{max}(Xi)$. It is reached for a certain coordinate j, whose index is noted $i_{max}$. The samples whose highest predictions have the same index form a cluster.

Accordingly, to maximize a likelihood for a sample Xi and one of its neighbors Xj of its neighborhood Nxi to belong to the same cluster means to maximize a probability for the index of the highest probability $\Phi\eta^{max}(Xi)$ of Xi and the index of the highest probability $\Phi\eta^{max}(Xj)$ of Xj to be the same.

The proposed method comprises two training steps. In the first step S10, a pretext model is trained to learn semantically meaningful features, in a fully self-supervised manner. These features are learned actually by training the pretext model to perform a pretext task. Pretext tasks normally do not need annotated data for the training of the neural network, and have been broadly explored in the literature. An example of a pretext task can be found in Ref. [2] or [5], in which the pretext model is trained to carry out instance discrimination.

In order to make sure that the pretext model does not give excessive importance to minor details of the samples, in step S10, the first training criterion tends to minimize, across the source samples of the source dataset, the distance between an output via the pretext model of a source sample and an output via the pretext model of a corresponding transformed sample.

For doing so, many transformations T can be used within the scope of the present disclosure. The transformation is chosen so as not to change the semantic content of the sample. For instance, if the samples are images, the transformation can be a rotation, an affine or perspective transformation, colorization, in-painting, etc.

Once the pretext model has been trained at step S10, it is possible to calculate, at step S20, neighborhoods for all samples of the dataset.

Then, in the second training step S30, the classifier $\Phi\eta$ is trained, on the basis of these neighborhoods.

The whole method is learning based. It can be implemented without the use of the k-means method, after the training step S10 in particular.

In some embodiments in which the samples are images, during the training step S10, the training criterion is set such that the images are weighted on region level. By doing so, more importance can be allotted to certain region(s) of the images.

This may be done for instance if it has been observed that the most relevant regions of the images are usually located in a certain part of the images. For instance, in autonomous driving applications, for detecting unusual objects left of the road, the most interesting region of the images acquired by the front camera of a vehicle is the lower half of the image, which represents the vicinity of the vehicle, rather than the upper half of the image which normally represents the more distant environment of the vehicle. Accordingly, the first training criterion can be biased to give more importance to the lower half of the image than to the upper half of the image.

In some embodiments, the first training criterion includes, for a considered sample, a term which increases when differences between a prediction $\Phi\Theta(Xi)$ for the considered sample (Xi) and a prediction $\Phi\Theta(T(Xi))$ for the corresponding transformed sample (T(Xi)) increases.

When the pretext model ($\Phi\Theta$) is trained at step S10, for at least one sample (Xi) of the training dataset, the first training criterion tends to minimize the distance between the sample (Xi) and the transformed sample (T(Xi)):

$$d(\Phi\Theta(Xi),\Phi\Theta(T(Xi)))$$

where T is the transformation.

Therefore, the training forces the pretext model to be invariant with respect to the transformations. This property is important to make sure that the pretext model can efficiently identify semantically close neighborhoods at step S20. Otherwise, there is a risk for the pretext model to latch on a low-level feature, or even on the pretext task itself, and to converge towards a solution which leads to determine neighborhoods at step S20 which do not group correctly semantically close samples.

In some embodiments, the second training criterion includes a summation:

$$\Lambda = -\frac{1}{|D|} \sum_{X \in D} \sum_{k \in NX_i} f < \Phi\eta(X), \Phi\eta(k) >$$

where
f is an increasing continuous function, for instance a logarithm;
<, > is the dot product;
D is a dataset used for training the classifier at step S30; and |D| is the number of samples in said dataset.

By taking into account such training criterion, the training algorithm forces the classifier to output substantially the same predictions for a sample $\Phi\eta(Xi)$ and for its neighbors $\Phi\eta(Xj)$, with Xj being a member of the neighborhood of Xi. Therefore, this training criterion tends to learn the classifier to classify the samples of a neighborhood in the same cluster.

In addition, in order to prevent the training performed at step S30 to converge toward degenerate solutions, in some embodiments, the second training criterion includes a summation:

$$\sum_{c \in C} g(\Phi\eta'^c) \text{ with } \Phi\eta'^c = \frac{1}{|D|}\Sigma_{X \in D}\Phi\eta^c(X)$$

Where
c is an index of a coordinate of the prediction $\Phi\eta(Xi)$ outputted by the classifier $\Phi\eta$, and C is a set comprising all c indices;
g is a function which measures the distance between the distribution of the predictions across clusters and a desired distribution of the predictions.
For instance, function g can be defined as Kullback-Leibler divergence, or entropy.
D is a dataset used for training the classifier at step S30; and |D| is the number of samples in said dataset.

In the above expression, when the function g is defined as entropy, it can be defined by:

$$g(\Phi\eta'^C) = \Phi\eta'^C \log \Phi\eta'^C$$

The summation proposed above for the second training criteria tends to force the classifier to distribute its predictions across all clusters (across all the indices of its output), rather than on a single one.

Thanks to the training of the classifier carried out at step S30, a set of weights η for the classifier $\Phi\eta$ is obtained, which enables the classifier to properly perform its classification function.

Moreover, it has been found that the performances of the classifier can be further improved by carrying out additional fine-tuning operations.

After the classifier has been trained at step S30, it is possible to identify so-called 'high-confidence samples' (noted $X^{HC}i$). These high-confidence samples are the samples for which the classifier outputs a prediction which has,—for one coordinate—, a very high value, which is above a predetermined threshold (normally close to 1). These high-confidence samples can be used to further train the classifier, in order to improve its classification performance.

In order to exploit this property, one or more additional training steps S40 may be carried out iteratively.

In this case, in some embodiments the training method further comprises executing at least once the following step S40, for fine-tuning the classifier:

S40) training the classifier ($\Phi\eta$) based on a third training criterion (Λ), the third training criterion being configured to maximize, for each considered sample (Xi) among high-confidence samples ($X^{hc}i$) whose highest probability ($\Phi\eta^{max}$(Xi)) is above a predetermined threshold (Thr), a probability ($\Phi\eta^j$(Xi)) for the considered sample to belong to the cluster (Cj) indicated by the maximum coordinate ($\Phi\eta^{max}$(Xi)) of the prediction ($\Phi\eta^{max}$(Xi)) for the considered sample (Xi).

When the training step S40 has been performed, the predictions (or confidence levels) $\Phi\eta(Xi)$ for the various samples Xi can be recalculated.

After the classifier $\Phi\eta$ has been trained by performing one or more steps S40, the confidence levels of its predictions globally increase. That is, the classifier learns to classify the samples increasingly well—or at least, with increasing certainty.

After each training step S40, based on the new values of the weights η, the set of high-confidence samples is updated. Consequently, at the next iteration, step S40 is carried out with a different loss function, and normally for an increased number of samples (because the number of samples qualified of high-confidence samples tends to increase).

The above fine-tuning step S40 can be called a self-labelling step, since in its loss function, the penalty taken into account for a prediction is calculated based on the predictions of the classifier itself. The loss function amounts to considering that each high confidence sample (as determined by the classifier itself) is labelled as belonging to the cluster Cj having the index j of the highest probability ($\Phi\eta^{max}$(Xi)) of the considered sample.

In some variants of the above embodiments, the training method further comprises executing at least one time the fine-tuning step S40; and the execution of fine-tuning step(s) (S40) is stopped when it is determined that the number of high-confidence samples does not increase anymore. That is, once this number plateaus (which means that despite the training steps S40, the classifier $\Phi\eta$ does not improve anymore its performance for classifying the samples into clusters), the algorithm can be stopped.

When the fine-tuning step S40 is repeated, the clusters (indicated by the high-confidence samples) become progressively more important and more relevant. Accordingly, these self-labeling steps S40 allow the classifier $\Phi\eta$ to progressively correct itself, as it gradually becomes more certain, adding more samples to the clusters. The fine-tuning steps even progressively correct the mistakes that may initially be present in the dataset, reclassifying the neighbors of a sample which might have been erroneously grouped initially in the same cluster as the sample.

Augmentations:

As mentioned before, augmentations of the samples, or transformed samples, are used for the training at step S10. In this purpose, such augmentations are added in the training dataset used at step S10. Such augmentations can also be added in the training dataset used for training the classifier at step S30 and/or step S40.

As already mentioned, a transformed sample is obtained based on a source sample. Consequently, the dataset used at step S10 can for instance be constituted (possibly only) with the samples of an initial dataset, called 'source dataset', and with transformed samples of part or all of these source samples, as augmentations of these source samples.

Different methods can be used to augment the dataset in order to improve the efficiency of the training steps S10, S30 and/or S40. For instance, when the samples are images, at one or more of these training steps, the training dataset can include augmentations obtained by applying to a source image one of the following functions: horizontal flip, slight rotation, light change, black-white (turning a color image into a grayscale image), jitter, etc.

In some embodiments, step S30 is repeated multiple times.

For instance, the dataset can be changed during the different iterations of step S30, in particular by adding augmentations to the dataset.

Moreover, in some embodiments, during step(s) S30 and/or S40, additional samples, called 'strong augmentations', can be added to the dataset.

A sample called a 'strong augmentation' is a transformed sample obtained by applying to a sample a transformation which modifies the sample content more deeply than the transformation of a usual augmentation. For instance, when the samples are images, one or more of the following transformations can be used to obtain a strong augmentation: Autocontrast, Equalize, Rotate, Solarize, Color, Contrast, Brightness, Sharpness, Shear, Translation, Translation, Posterize, Shear. More information on strong augmentations can be found in Ref. [8]. After this or these transformations have been performed, in order to obtain the transformed sample, usually a Cut-out function is applied. The Cut-out function is described by Ref [7].

For instance, in some embodiments, a strong augmentation $SA(Xi)$ of a high confidence sample $X^{HC}i$ is added to the dataset used for a step S40; and the third training criterion is configured to maximize a likelihood for said strong augmentation $SA(Xi)$ to belong to the same cluster as the high confidence sample $X^{HC}i$.

In other terms, at step S40, the third training criterion is configured so that during the training, the classifier will learn to classify (as much as possible) the considered high confidence sample $X^{HC}i$ and the strong augmentation thereof in the same cluster (i.e. the rank of the highest coordinate of the classifier prediction $\Phi\eta$ ($X^{HC}i$) for the considered high confidence sample $X^{HC}i$ will be the same as the rank of the highest coordinate of the classifier prediction $\Phi\eta$ ((SA($X^{HC}i$)) for the strong augmentation of the considered high confidence sample $X^{HC}i$.

By doing so, overfitting can be avoided.

The training method according to the present disclosure makes it possible to efficiently train the classifier, in a fully unsupervised mode. Tested on datasets like CIFAR10, STL10 and even Imagenet, it has outperformed many state-of-the-art methods for unsupervised learning.

The method can be complemented by some semi-supervised training, to take into account prior knowledge about the samples. This prior knowledge can be taken into account in different ways: either in the definition of the neighborhoods at step S20, and/or during the training stage(s) of the classifier, at step S30 and/or S40.

Accordingly, in some embodiments, the method comprises, at one or more of steps S20, S30 and S40, taking into account prior knowledge that a plurality of samples, called similar samples, form a cluster (this prior knowledge being obtained independently of steps S10, S20 and S30); whereby, at step S20, said similar samples are to be considered as neighbors when defining the neighborhoods, and/or at step S30 or S40, the classifier has to be trained so as to classify the similar samples in the same cluster.

In some embodiments, at step S20, for at least a set of two or more similar samples, for which it has been determined that the similar samples should belong to the same cluster, a neighborhood is determined for each of the similar samples, said neighborhood comprising at least the other one(s) of the similar samples. In this case, for each of the similar samples, the neighborhood of the sample can for instance be specially prepared so as to include all the other similar samples, for which it is considered that they belong to the same cluster.

The set or sets of similar samples can then be included in the dataset used for training the classifier at step S30 and at step S30, the neighborhoods of the similar samples determined as described above can be used.

In addition, in some embodiments, at step S30, the second training criterion is configured, for at least a set of two or more similar samples of the dataset, for which it has been determined that the similar samples should belong to the same cluster, to tend to maximize a likelihood for said similar samples of the considered set of similar samples to belong to the same cluster.

Similarly, in some embodiments, at step S40, the third training criterion is configured, for at least a set of two or more similar samples of the dataset, for which it has been determined that the similar samples should belong to the same cluster, to tend to maximize a likelihood for said similar samples of the considered set of similar samples to belong to the same cluster.

Accordingly, when prior knowledge on the clusters is to be taken into account at step S20, S30 or S40 as recited above, for each of the similar samples for which we have prior knowledge that they belong to the same cluster, at the considered training step S30 and/or S40, the training criterion is specially adapted or prepared so as to include terms which tend to maximize a likelihood for the similar samples of any considered set of similar samples to belong to the same cluster.

For instance, this may amount, for some samples which are not (or have not become) high-confidence samples, to allot manually these samples to the appropriate clusters. Even in this case, the proposed method is economically attractive, since it greatly reduces the number of the samples that need annotation, by automatically determining adequate annotations for the high-confidence samples.

Classification System and Method

As part of the present disclosure, a classification method is proposed.

This method comprises a step D) of classifying samples with a classifier trained with one of the above-described training methods.

The classification method can be used in many different contexts.

In certain applications, a sample is a datum based on one or more images acquired by one or more cameras; the classifier is trained to classify such sample. The one or more cameras are for instance one or more cameras of a vehicle. A datum based on one or more images can of course be an image, but it can also be a composite image obtained by stitching together several images, or a processed image obtained by applying a pre-processing to one or several images (for instance cropping the image(s)), etc.

In some embodiments, in the case where the sample (Xi) comprises one or more acquired image(s), the classification method further comprises a step B:

B) generating at least one sample sub-image based on the sample; and at step D, the sample is classified by classifying said at least one sample sub-image.

In these embodiments, the sub-images are generated at least to perform the classification step D. In some embodiments, in which a sample is a datum based on one or more images acquired by one or more cameras, the classification method comprises the following steps:

A. Acquiring data based on an output of one or more camera or non-camera sensor(s); and C. Detecting whether the acquired data comprises unusual data; in addition, step D is carried out only if it has been detected at step C that the acquired data comprises unusual data.

Herein, a non-camera sensor is a sensor which is not a camera; for instance, a lidar or a radar.

Many methods can be used to detect unusual information in a feed of acquired data. For instance, in the case of a lidar constantly screening the road in front of a vehicle, unusual information can be information (for instance, acquired 3D-points distinctly above the normal surface of the road) showing the presence of something unusual on the road, typically an object abandoned on the road or which fell on the road. In such situation, the above-proposed classification method is very useful to determine the type of object present on the road and trigger the appropriate action, in particular whether to neglect the object (if it is an empty plastic bag blown on the road by the wind), or to take any action in order not to hit the object (if it is a heavy rock fallen on the road).

In some embodiments, in the case where the acquired data comprises one or more acquired image(s), the classification method further comprises a step B:

B) generating at least one data sub-image based on the acquired data; and at step C, the unusual data is detected in said at least one data sub-image.

In these embodiments, the sub-images are generated at least to perform the detection step C.

In some embodiments of the above classification method, at step D, the sample is classified by classifying said at least one data sub-image.

In the embodiments described above, in which sub-images are generated, a plurality of sub-images are generated (based on an initial image), and the sample is classified at step D, and/or unusual data is detected at step C (as the case may be) based on said plurality of sub-images.

In a particular implementation, the various steps of any one of the above-presented methods are determined by computer program instructions.

The present disclosure therefore further encompasses a system (a classifier training system or a sample classification system) comprising one or more processors and a memory, the memory storing instructions which, when executed by the one or more processors, cause the one or more processors to train a classifier using one of the above-defined training methods, or to classify a sample using one of the above-defined classification methods.

The present disclosure also provides a computer program which is stored on a computer readable storage media, and which is suitable for being performed on one or more processors, the program including instructions adapted to perform the steps of one of the above-defined methods when it is run on the one or more processors.

The computer program may use any programming language, and be in the form of source code, object code, or code intermediate between source code and object code, such as in a partially compiled form, or in any other form.

The present disclosure also provides a computer-readable recording medium, such as non-volatile, including instructions of a computer program as defined above.

The recording medium may be an entity or device capable of storing the program. For example, the medium may comprise storage medium, such as a read only memory (ROM), e.g. a compact disk (CD) ROM, or a microelectronic circuit ROM, or indeed magnetic recording medium, e.g. a floppy disk or a hard disk.

Alternatively, the recording medium may be an integrated circuit in which the program is incorporated, the circuit being adapted to execute or to be used in the execution of one of the methods of the present disclosure.

BRIEF DESCRIPTION OF THE DRAWINGS

The present disclosure may be better understood and its numerous other objects and advantages will become apparent to those skilled in the art by reference to the accompanying drawings, wherein like reference numerals refer to like elements in the several figures and in which.

DESCRIPTION OF THE EMBODIMENTS

Reference will now be made in detail to exemplary embodiments of the disclosure, examples of which are illustrated in the accompanying drawings.

Training Method

Figure 1:
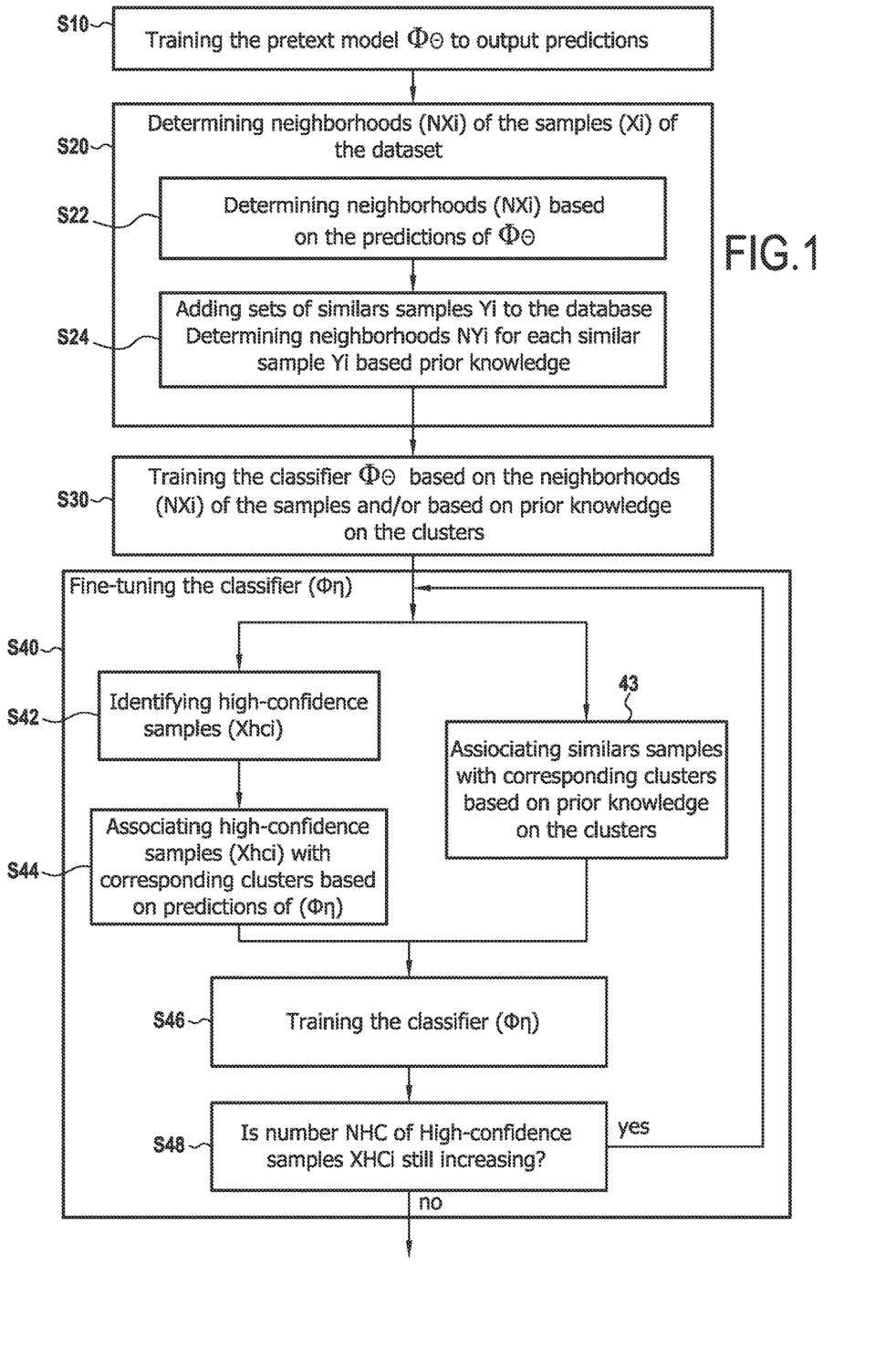
FIG. 1 is a flowchart highlighting an exemplary training method according to an embodiment of the present disclosure.

First, an exemplary training method for training a classifier $\Phi\eta$ to output predictions for samples Xi will be presented, which constitutes a first embodiment of the present disclosure. In FIG. 1, the steps of this method are schematically depicted.

S0) Preparation

To implement the method, an initial dataset of samples (in the present embodiment, of images), called the source dataset SD, is needed. This dataset comprises a variety of samples (of images), large enough to adequately train the classifier to identify and distinguish the different individually identifiable clusters of the dataset.

A pretext task is selected. In the case of images, for instance, the pretext task generally consists in trying to learn a visual feature of an image.

One or more transformation(s) T is or are selected. This transformation(s) is/are the transformation(s) for which the prediction made by the pretext model should not change.

The transformation is chosen such that it does not change the semantic of the image. It can be for instance flipping the image, or turning it to grayscale, etc.

In this embodiment, the pretext model $\Phi\Theta$ and the classifier $\Phi\eta$ are both neural networks. More specifically, each of them includes a standard ResNet-18 backbone as its core, and one or more layers added downstream this core neural network.

The weights of the pretext model $\Phi\Theta$ are noted $\Theta$, while the weights of the classifier $\Phi\eta$ are noted $\eta$.

The pretext model $\Phi\Theta$ has a standard ResNet-18 backbone as its core neural network. One or more layers are added downstream this core neural network in order to adapt the output of the pretext model to the selected pretext task.

For example, if the pretext task is the instance discrimination task, the added layer(s) can be a linear layer that outputs the desired number of features.

The core of the classifier $\Phi\eta$ can be the same neural network as the core neural network of the pretext model (in the present example, a ResNet-18 backbone).

As for the pretext model, one or more layers are added downstream of this core neural network. This or these additional layers are configured so that the classifier will output a number C of outputs, which represent the respective probabilities for the inputted sample to belong to respectively C clusters.

To constrain the classifier $\Phi\eta$ to output probabilities, the most downstream layer of the classifier is usually a normalization layer, which ensures that the sum of the outputs is always constant. For instance, the most downstream layer can be a softmax layer.

The number C of clusters, which is the number of coordinates in the output of the classifier, has to be defined during the preparation of the classifier. This number is usually initially defined based on a rough estimate of the number of clusters which are expected to be found in the dataset. In case of doubt, the pretext and classifiers may be initially defined with a high number of clusters (which is called 'overclustering'), and then to force the cluster distribution to be uniform. Indeed, the number of clusters can be reduced afterwards, if it is observed that some clusters never correspond to the highest coordinate (noted $\Phi^{max}\Theta$ or respectively $\Phi^{max}\eta$) in the predictions of the pretext or classifier.

S10) Training the Pretext Model $\Phi\Theta$

Once the above elements have been prepared, the first training step S10 is executed: The pretext model $\Phi\Theta$ is trained to perform the pretext task.

The training is performed using a first training criterion which is adapted to learn the pretext task. The training criterion can be defined for instance based on the Refs. [2], [5] or [6].

In addition, the first training criterion is defined to further ensure, simultaneously, that the predictions made by the pretext model remain substantially unchanged when a transformation is applied to a sample.

To take this objective into account, in this embodiment during the training step S10, the weights $\Theta$ of the pretext model $\Phi\Theta$ are modified in order to try to minimize, for all samples of the source dataset, the distance between the prediction for the sample, and the prediction for the corresponding transformed sample. This distance is noted:

$$d(\Phi\Theta(Xi),\Phi\Theta(T(Xi)))$$

The above value is included in the first training criterion, in addition to other terms which are used to train the pretext model to learn the pretext task. Thanks to this value, the first training criterion tends to minimize, across the samples of the source dataset SD, the distance between an output via the pretext model ($\Phi\Theta$) of a source sample Xi and an output via the pretext model $\Phi\Theta$ of a corresponding transformed sample T(Xi).

S20) Determining the Neighborhoods (NXi)

Then, in step S20, the trained pretext model $\Phi\Theta$ is used to determine the K nearest neighbors of each sample Xi of the dataset.

K here is an integer at least equal to 1. Setting the number K of neighbors in a set Nxi to at least 1 (or more, for instance at least 5, or at least 10) is important to better capture the variance across each individual cluster.

At least a step S22, and optionally a step S24, can be carried out to determine the neighborhoods NXi of the samples.

In step S22, the neighborhoods NXi are determined based on the predictions of the pretext model $\Phi\Theta$.

In this purpose, in step S22, the K nearest neighbors of each sample Xi of the dataset are identified in the embedding space $\Phi\Theta$.

In other words, for each sample Xi of the dataset D, the neighborhood Nxi,—or the set Nxi of neighbors of the sample Xi —, which comprises the K samples Xj of dataset D for which $Dist_{\Phi\Theta}(Xi, Xj)$ is minimum, is determined.

Here, $Dist_{\Phi\Theta}(Xi,Xj)$ is a distance function in the embedding space $\Phi\Theta$; that is:

$$Dist_{\Phi\Theta}(Xi,Xj)=Dist(\Phi\Theta(Xi),\Phi\Theta(Xj))$$

where Dist is a usual distance function.

In the above equation, the function Dist can be any distance function; for instance an L2-norm:

$$Dist(\Phi\Theta(Xi),\Phi\Theta(Xj))=\|\Phi\Theta(Xi)-\Phi\Theta(Xj)\|.$$

The neighborhoods NXi can be determined by different ways.

For instance, the neighbors of a sample Xi may be identified as the samples Xj for which a 'cosine similarity' between $\Phi\Theta(Xi)$ and $\Phi\Theta(Xj)$ is maximum. As usual, the cosine similarity between two vectors V,W is the dot product between these vectors, normalized:

$$Cosine\_similarity(V,W)=V\cdot W/(\|V\|\cdot\|W\|).$$

In addition to step S22, an optional step S24 can be carried out if there is prior knowledge on the way the samples are clustered.

Step S24 may be carried out in two different ways.

Step S24 may be carried out in a first way by adding new samples Yi to the dataset to be used at step S30, when it is known beforehand that these additional samples Yi form one or more clusters. In other words, in each of these clusters, it is known beforehand that all the additional samples Yi of the cluster are similar to each other.

In that case, the neighborhood NYi of each of these additional similar samples Yi can be defined as comprising the other samples Yj (the other similar samples Yj) of the same cluster.

Thereafter, step S30 can then be executed based on the enlarged dataset comprising the samples Xi and Yi.

Step S24 may be carried out in a second way simply by taking into account prior information that a set of samples of the dataset to be used at step S30 constitute a cluster. That is, it is known beforehand that different samples of the dataset for step S30 are similar samples, thus have to be classified as belonging to the same cluster. Several such sets of samples can be identified as constituting a cluster.

In that case, the neighborhood NXi of these samples Xi, whose cluster is known beforehand, is defined as comprising the other samples Xj of the same cluster. That is, the definition of the neighborhood NXi of one of these samples is then defined based on the prior knowledge of the clusters, and conversely the neighborhood NXi determined based on the pretext model is not taken into account. Step S30 is then executed based on the source dataset, taking into account the neighborhoods NXi optimized as defined at step S24.

S30) Training the Classifier

The neighborhood sets NXi identified at step S20 constitute precursors of the clusters that the classifier $\Phi\eta$ will have to identify.

Once these neighborhoods Nxi have been identified for all samples Xi of the dataset, the classifier $\Phi\eta$ is trained.

To speed up training, the weights of the core neural network of the pretext model $\Phi\Theta$, can be used as initial values for the core neural network of the classifier $\Phi\eta$.

The classifier $\Phi\eta$ is trained to classify the samples of the dataset into a set C of clusters. The classifier $\Phi\eta$ realizes such classification by performing a soft assignment of an inputted sample Xi over the clusters C={1, ..., C}, with $\Phi\eta$ (Xi)$\in[0, 1]^C$. The purpose of the training is therefore to learn a clustering function parameterized by the neural network $\Phi\eta$ with weights $\eta$, to classify together a sample Xi and its neighbors of the set Nxi.

This training is carried out using a second training criterion. This criterion is a loss function $\Lambda$ which for each sample Xi takes into account respective distances between an output ($\Phi\eta(Xi)$) of the sample (Xi) by the classifier ($\Phi\eta$) and outputs of the respective neighbors of the sample (Xi) of the set (NXi) of neighbors of the sample, and tends to minimize these distances.

In the proposed embodiment, during training the weights of $\Phi\eta$ are obtained by minimizing the following second training criterion (or loss function) $\Lambda$:

$$\Lambda = -\frac{1}{|D|}\sum_{X \in D}\sum_{k \in NX_i} \log < \Phi\eta(X),$$

$$\Phi\eta(k) > + \lambda \sum_{c \in C} \Phi\eta'^c \log(\Phi\eta'^c) \text{ with } \Phi\eta'^c = \frac{1}{|D|}\sum_{X \in D}\Phi\eta^c(X)$$

In the equation above, <, > denotes the dot product operator.

The first term in this equation (the double summation) imposes $\Phi\eta$ to make consistent predictions for a sample Xi and its neighbors of its set of neighbors Nxi. Note that, a dot product will be maximal when two predictions are equal to 1 or very close to 1 (very confident) and assigned to the same cluster (consistent).

In addition, to prevent the loss function from leading $\Phi\eta$ to assign all samples to a single cluster, the equation further includes an entropy term (the second term in the above equation), which spreads the predictions uniformly across the clusters C and therefore, tends to force the samples Xi to be distributed over the whole set C of clusters.

In the present example, the weight on the entropy term is set to $\lambda=2$. A higher weight avoids the premature grouping of samples during training.

If the probability distribution over the clusters C is known in advance (which is not the case here), this second term can be replaced by KL-divergence.

During step S30, the training dataset can be broadened by including therein augmentations of the initial samples of the dataset. In this case, the clustering loss function $\Lambda$ is adapted to ensure consistency between the samples and their augmentations. This consistency is ensured by including the augmentations of a sample in its set of neighbors Nxi.

Here, the reference to "consistency" means that a sample and its augmentations should be classified in the same cluster, which means that Dist $\Phi\Theta$ (Xi,Xj) should be small.

S40) Fine-Tuning the Classifier $\Phi\eta$

The above-described clustering step S30 provides a first value for the weights $\eta$ of the classifier $\Phi\eta$. At step S30, the second training objective $\Lambda$ used for the initial training of $\Phi\eta$ has imposed consistency between a sample Xi and its neighbors of the set Nxi. This consistency is used at step S40 to define the classes, or clusters, of the dataset as follows (The step S40 can be performed repeatedly, as will be explained after):

Each fine-tuning step S40) includes the following sub-steps:

S42) Identifying High-Confidence Samples ($X^{hc}i$)

The following notations are use: For a sample Xi,
the probability, or level of confidence, for a sample Xi to belong to a cluster Cj is noted $\Phi\eta^j Xi$), where j is an integer from 1 to C; and
the highest probability, or maximum level of confidence, for a sample Xi across its different coordinates j (j=1 ... C) is noted $\Phi\eta^{max}(Xi)$. In other words:

$\Phi\eta^{max}(Xi)=\text{Max}_j(\Phi\eta^j(Xi))$.

It has been experimentally observed that samples Xi with highly confident predictions ($\Phi\eta^{max}(Xi)\approx 1$), or 'high-confidence samples $X^{hc}i$', tend to be correctly classified into clusters.

Based on this observation, the clusters Cj that are used for fine-tuning the classifier $\Phi\eta$ are determined based on the high-confidence samples $X^{hc}i$:

First, a confidence threshold Thr is chosen.

Then, the high-confidence samples $X^{hc}i$, whose highest probability ($\Phi\eta^{max}(Xi)$) is above the confidence threshold Thr, are identified.

The number $N^{HC}$ of High-confidence samples $X^{HC}i$ is calculated.

On this basis, the clusters Cj (j=1 ... C) are defined: Each cluster Cj includes (only) the identified high-confidence samples $X^{hc}i$, for which $\Phi\eta^{max}(Xi)=\Phi\eta^j(Xi)>\text{Thr}$. (Some clusters can be empty).

This approach, based on the already well classified examples, can be called a self-labelling approach. In each class Cj, the sample(s) Xi having a particularly high level of confidence $\Phi\eta^j(Xi)$ can be seen as prototype(s) of the class.

S44) Associating High-Confidence Samples ($X^{hc}i$) with a Corresponding Cluster Then, each high-confidence sample $X^{hc}i$ is associated (or labelled) with the cluster indicated by the maximum coordinate ($\Phi\eta^{max}(Xi)$) of the prediction $\Phi\eta(Xi)$ outputted by the classifier for the sample.

A semantic label is attributed to each cluster. This semantic label can be chosen for instance based on at least one high-confidence sample for each cluster. Then, all the other samples of this cluster are automatically associated with this semantic label.

Of course, semantic labels can also be attributed to clusters which comprise no high-confidence sample.

In parallel to steps S42 and S44, another step S43, optional, can be carried out to group the samples into clusters.

Indeed as for step S24, in some cases it is known beforehand that some samples are similar to each other, and should therefore belong to the same cluster.

In this case, for these samples, a step S43 may be carried out.

Step S43 consists in associating all the samples of a group of samples deemed similar samples so as to form a cluster.

S46) Training the Classifier $\Phi\eta$

The classifier $\Phi\eta$ is then trained to recognize the clusters Cj. This training is carried out with a third training criterion.

This third training criterion is configured to maximize, for each of the high-confidence samples $X^{hc}i$, a probability ($\Phi\eta^j(Xi)$) for the high-confidence sample $X^{hc}i$ to belong to the cluster (Cj) indicated by the maximum coordinate ($\Phi\eta^{max}(Xi)$) of the prediction ($\Phi\eta(Xi)$) outputted by the classifier for the high-confidence samples $X^{hc}i$. That is, the third training criterion is configured to maximize, for each of the high-confidence samples $X^{hc}i$, the probability $\Phi\eta^j(Xi)$, where j is the rank of the maximum coordinate $\Phi\eta^{max}(Xi)$.

This can be achieved by including in the third training criterion a term (which is possibly a sum of one or more sub-terms), for a considered high-confidence sample $X^{hc}i$, which is an increasing function of the probability $(\Phi\eta^j(Xi)$, where $\Phi\eta^j(Xi)$ is the maximum coordinate $\Phi\eta^{max}(Xi)$ of the prediction $\Phi\eta(Xi)$.

For instance, the third training criterion can penalize predictions by the classifier, in which the probability of a high-confidence sample to belong to the cluster with which it is associated is less than 1.

In the present embodiment the loss function includes, for each of the high-confidence sample $X^{hc}i$, a term which decreases when the probability $\Phi\eta^j(Xi)$ for the considered sample to belong to its associated cluster Cj becomes close to 1.

The loss function can be a cross-entropy loss.

Specifically, in the present embodiment a weighted cross-entropy loss is used, to compensate for the imbalance between confident samples across clusters. In this purpose, the weight assigned to a cluster is inversely proportional to the number of high-confidence samples in the cluster.

In case step S43 is performed, all the sets of similar samples that have been identified at step S43 are included in the training dataset of step S46.

In addition, the third training criterion is then configured so as, during training, for all the sets of similar samples that have been included in the dataset, to maximize a likelihood for the similar samples of the considered set of similar samples to belong to the same cluster.

S48) Checking Whether the Fine-Tuning Steps should be Continued

After the classifier $\Phi\eta$ has been retrained at step S46, the predictions $\Phi\eta(Xi)$ for each of the samples can be recalculated. The High-confidence samples $X^{HC}i$ are identified on the basis of the updated predictions.

The number $N^{HC}$ of High-confidence samples $X^{HC}i$ is also updated.

It is determined whether the updated number $N^{HC}$ is higher than its previous value.

If the answer is YES (the number $N^{HC}$ is still increasing), it is concluded that the fine-tuning continues to improve the quality of the predictions of the classifier $\Phi\eta$. In that case, at least one additional fine-tuning step S40 is carried out.

Conversely, if the answer is NO (the number $N^{HC}$ has reached a plateau), it is concluded that the fine-tuning does not improve anymore the quality of the predictions of the classifier $\Phi\eta$. Therefore, the fine-tuning steps S40 are stopped.

Classification System and Method

Figure 2:
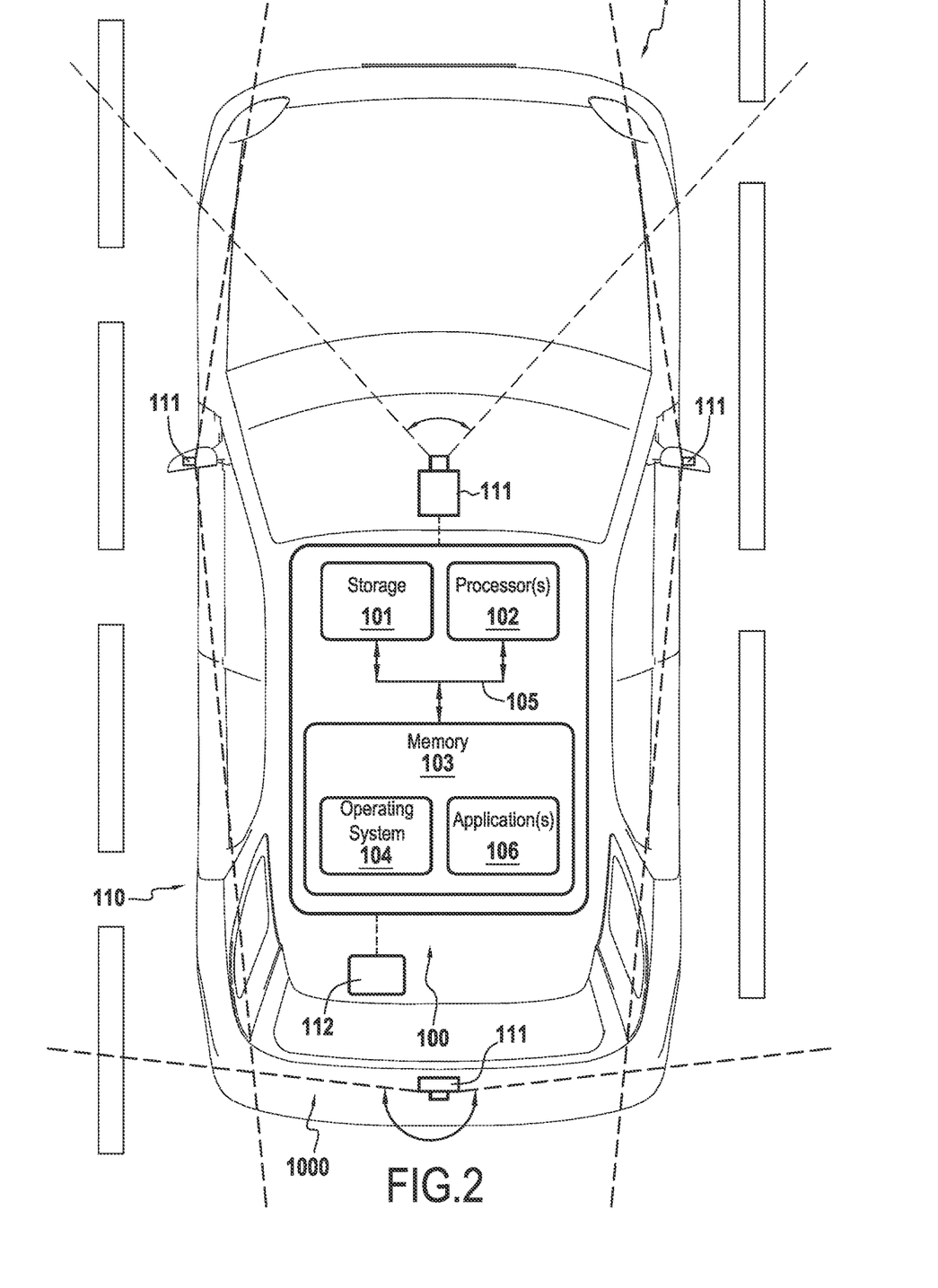
FIG. 2 shows a classification system according to an embodiment of the present disclosure.
Figure 3:
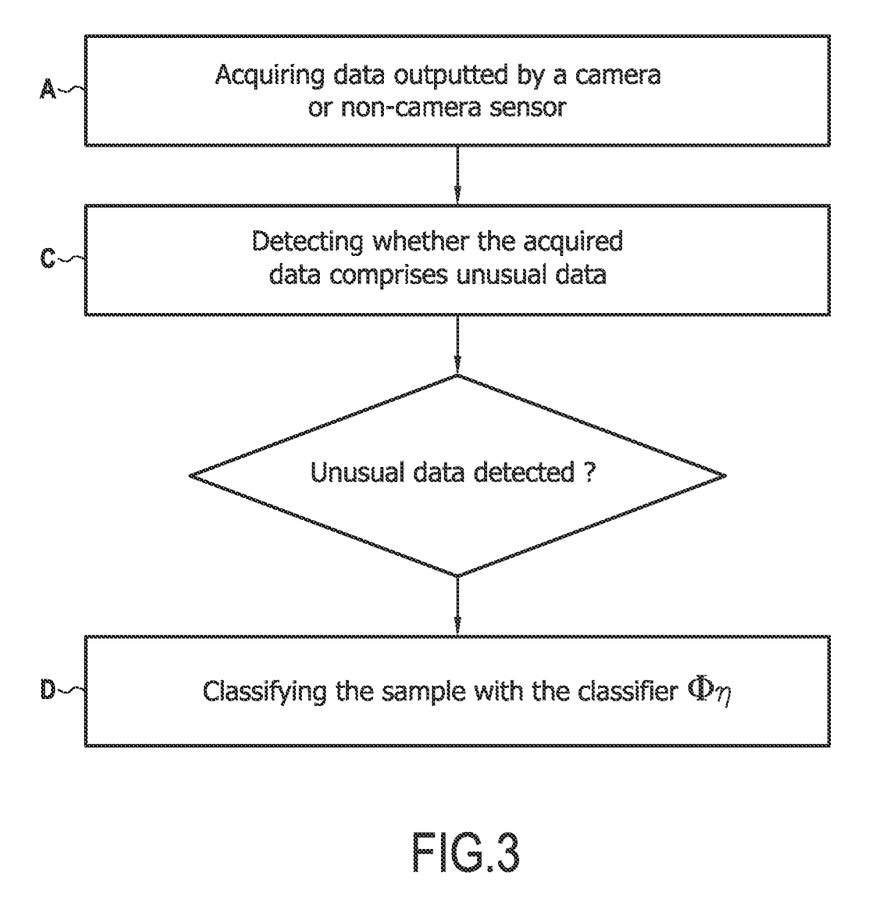
FIG. 3 is a flowchart highlighting an exemplary classification method according to an embodiment of the present disclosure.
Figure 4:
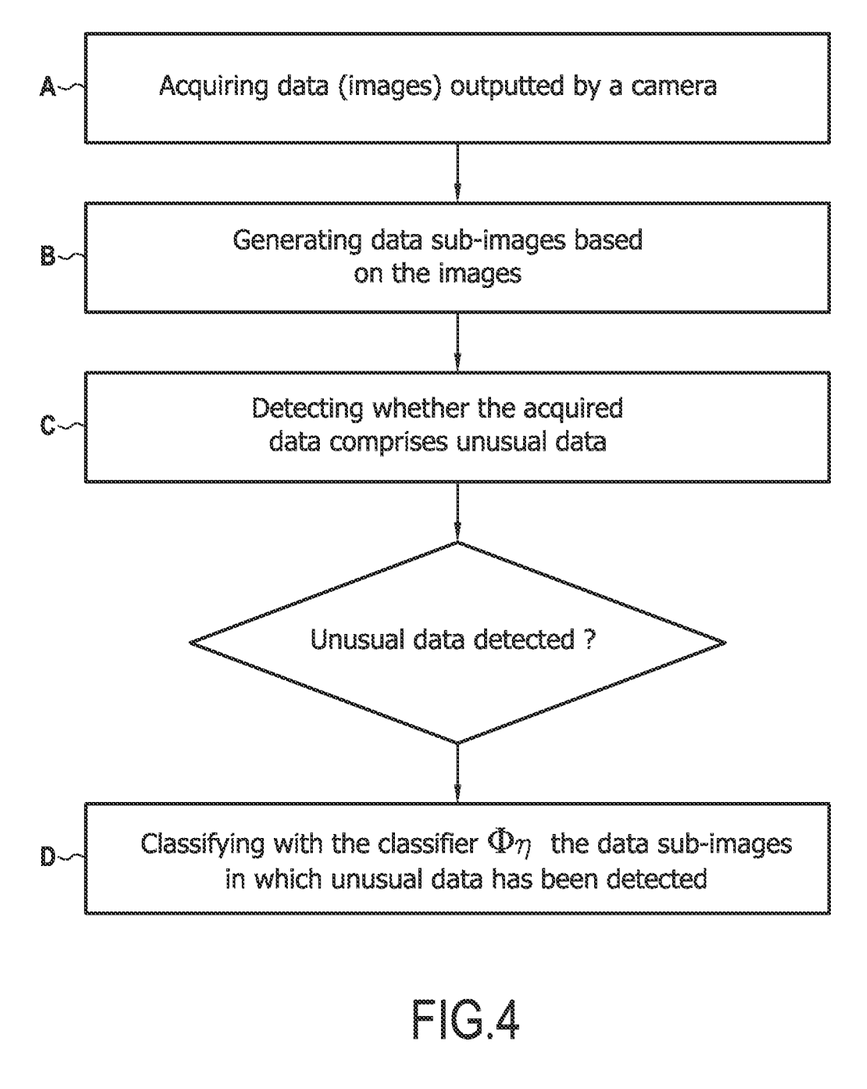
FIG. 4 is a flowchart highlighting an exemplary classification method according to another embodiment of the present disclosure.

In relation with FIGS. 2 to 4, classification methods and systems according to the present disclosure will now be presented.

The material architecture of a system 1000 is shown schematically on FIG. 2. System 1000 is both a classifier training system and a sample classification system.

System 1000 is composed mainly by a central computer 100 and a set of sensors 110, mounted on a vehicle 1.

Most hardware components of system 1000 are shared components, which are used to perform multiple tasks. For this reason, the hardware components which constitute system 1000 perform the functions of the classification system 1000, but may also perform other functions.

Although the system 1000 in this embodiment (in particular the central computer 100) is physically located in vehicle 1, it does not necessarily need to be in the vehicle. Actually, it can be located anywhere, as long as communication equipment is provided to transmit the necessary inputs to the central computer 100.

Moreover, although the central computer 100 is represented on FIG. 1 in a single box, it may comprise one or more processors, and can therefore be a distributed calculation system, distributed over a plurality of processors, possibly physically arranged on different locations.

The set of sensors 110 comprises four external cameras 111, as well as a lidar unit 112. Among cameras 111, a front camera 111 is arranged so as to acquire images of the scene in front of vehicle 1.

The functions of system 100 are implemented on the central computer 100.

Central computer 100 comprises a storage 101, one or more processor(s) 102, a memory 103, an operating system 104, a communication infrastructure 105 and additional applications 106.

The one or more processors 102 are intended to be representative of the presence of any one or more processors or processing devices, of any form.

The communication infrastructure 105 is a data bus to which the above-mentioned sensors 110 are connected, and through which the signals outputted by these sensor units are transmitted to the central computer 100.

The storage 101, the processor(s) 102, the memory 103, and the operating system 104 are communicatively coupled over the communication infrastructure 105.

A classification computer program CI, which comprise instructions adapted to perform the steps of the classification method of the present disclosure when it is run on the one or more processors 102, is stored in memory 103. In addition, a training computer program Tr, which comprise instructions adapted to perform the steps of the training method of the present disclosure when it is run on the one or more processors 102, is also stored in memory 103. The programs CI and Tr, and the memory 103, are examples respectively of computer programs and a computer-readable recording medium pursuant to the present disclosure. The memory 103 of the computer system 100 indeed constitutes a recording medium according to the disclosure, readable by the one or more processor(s) 102 and on which said program is recorded.

A first function of the system 1000, when it executes program Tr, is to train classifiers $\Phi\eta$.

Another function of the system 1000, based on program CI, is to classify the objects detected on the road in front of vehicle 1 during a trip.

In this purpose, computer 100 is configured to execute program CI, so as to carry out the following steps (FIG. 3):

A. Computer 100 periodically acquires, at relatively high frequency, clouds of points outputted by the lidar unit 112 and images outputted by cameras 111.

C. Computer 100 detects whether the acquired data comprises unusual data. Such unusual data can be points situated above the surface of the road, showing the presence of an object on the road.

Computer 100 is configured, when the presence of such unusual data is detected, to trigger a classification:

D. The last image acquired by the front camera 111 is processed by the classifier $\Phi\eta$. The classifier $\Phi\eta$ thus predicts the cluster, i.e. the type of objects, to which the object detected in front of vehicle 1 corresponds. This information is transmitted either to the driver of the vehicle, and/or to a driving system of the vehicle.

In an embodiment (FIG. 4), computer 100 is configured to carry out an additional step B of generating, for each image acquired by the front camera 111, a set of data sub-images based on the acquired image. For instance, at each time step a matrix of 16 sub-images can be created, by dividing the image acquired by camera 111 in 16 areas (these areas may have some overlap).

Then, step C is carried out based on these data sub-images: In some or each of the data sub-images, it is detected whether there is unusual data.

If no unusual data is detected, the algorithm is stopped.

Otherwise, the data sub-images in which unusual data has been detected are classified by the classifier $\Phi\eta$. In this purpose, the classifier must have been trained on sub-images (data sub-images) of the images (data) acquired by the front camera 111.

On the basis of the results predicted by the classifier $\Phi\eta$ for all the analyzed data sub-images, a list of the different objects identified in the scene in front of the car is determined.

Based on this information, the driver or the driving system of the vehicle can take the appropriate action in response to the presence of the object on the road.

It is also possible to perform step C before step B.

In that case, step C of detecting whether there is unusual data is performed on the basis of an image acquired by a sensor, for instance the front camera 111. Then, if unusual data has been identified in this image, sub-images of the acquired image are generated (step B). The classification step D is then performed. If at step C, the part of the image where the unusual data lies has been determined, step D may be performed based only on the sub-images corresponding to this part of the image; otherwise, step D can be carried out for all the sub-images.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

What is claimed is:

1. A computer-implemented training method for training a classifier ($\Phi\eta$), wherein:
   a transformed sample being a sample obtained by applying a transformation (T) to a source sample, where the source sample is a datum of a source dataset (SD);
   the training method comprises:
   S10) training a pretext model ($\Phi\Theta$) to learn a pretext task, based on a source dataset (SD), by using a first training criterion which tends to minimize, across the source samples of the source dataset, a distance between an output of a source sample via the pretext model ($\Phi\Theta$) and an output of a corresponding transformed sample via the pretext model ($\Phi\Theta$);
   S20) for at least one sample among the samples (Xi) of the source dataset (SD), determining a neighborhood (NXi) of the at least one sample;
   wherein for the at least one sample, the neighborhood (NXi) of the at least one sample comprises K closest neighbors of the sample, K being an integer, K>=1, the K closest neighbors of the sample being K samples Xj of the dataset having smallest distances between $\Phi\Theta(Xi)$ and $\Phi\Theta(Xj)$;

S30) training the classifier $\Phi\eta$ to predict respective estimated probabilities $\Phi\eta j(Xi)$, j=1 . . . C, for a sample to belong to respective clusters (Cj), by using a second training criterion which:
   tends to maximize a likelihood for a sample and a neighbor (Xj) of the sample belonging to the neighborhood (NXi) of the sample to belong to the same cluster; and
   tends to force the samples to be distributed over a plurality of clusters;
   the second training criterion includes a summation:

$$\Lambda = -\frac{1}{|D|} \sum_{X \in D} \sum_{k \in NXi} f < \Phi\eta(X), \Phi\eta(k) >$$

where
f is an increasing continuous function, for instance a logarithm;
<, > is a dot product;
D is a dataset used for training the classifier at step S30; and
|D| is the number of samples in the dataset.

2. The training method of claim 1, wherein the first training criterion includes, for a considered sample, a term which increases when differences between a prediction $\Phi\Theta(Xi)$ for the considered sample (Xi) and a prediction $\Phi\Theta(Tj(Xi))$ for the corresponding transformed sample (T(Xi)) increases.

3. The training method according to claim 1, wherein at step S20, for at least a set of two or more similar samples, for which it has been determined that the similar samples should belong to the same cluster, a neighborhood is determined for each of the similar samples, the neighborhood comprising at least the other one(s) of the similar samples.

4. The training method according to claim 1, wherein at step S30, the second training criterion is configured, for at least a set of two or more similar samples of the dataset, for which it has been determined that the similar samples should belong to the same cluster, to tend to maximize a likelihood for the similar samples of the considered set of similar samples to belong to the same cluster.

5. The training method of claim 1, further comprising executing at least one time a fine-tuning step S40:
   S40) training the classifier ($\Phi\eta$) based on a third training criterion ($\Lambda$), the third training criterion being configured to maximize, for each considered sample (Xi) among high-confidence samples ($X^{hc}i$) whose highest probability ($\Phi\eta^{max}(Xi)$) is above a predetermined threshold (Thr), a probability ($\Phi\eta^j)(Xi)$) for the considered sample to belong to the cluster (Cj) indicated by a maximum coordinate ($\Phi\eta^{max}(Xi)$) of the prediction ($\Phi\eta^{max}(Xi)$) for the considered sample (Xi).

6. The training method of claim 5, wherein an execution of fine-tuning step(s) (S40) is stopped when it is determined that the number of high-confidence samples does not increase anymore.

7. The training method according to claim 5, wherein at step S40, the third training criterion is configured, for at least a set of two or more similar samples of the dataset, for which it has been determined that the similar samples should belong to the same cluster, to tend to maximize a likelihood for the similar samples of the considered set of similar samples to belong to the same cluster.

8. The training method according to claim 5, wherein
   a strong augmentation (SA(Xi)) of a high confidence sample ($X^{HC}i$) is added to the dataset used for a step S40; and
   the third training criterion is configured to maximize a likelihood for the strong augmentation (SA(Xi)) to belong to the same cluster as the high confidence sample ($X^{HC}i$).

9. The training method according to claim 1, wherein
   the training method comprises, at one or more of steps S20, S30 and S40, taking into account prior knowledge that a plurality of samples, called similar samples, form a cluster; whereby,
   at step S20, the similar samples are to be considered as neighbors when defining the neighborhoods, and/or
   at step S30 or S40, the classifier has to be trained so as to classify the similar samples in the same cluster.

10. A classification method comprising a step D:
    D) classifying samples with a classifier trained with a training method according to claim 1.

11. A classification method according to claim 10, in the case where the sample (Xi) comprises one or more acquired image(s),
    further comprising a step B:
    B) generating at least one sample sub-image based on the sample; and wherein
    at step D, the sample is classified by classifying the at least one sample sub-image.

12. A classification method according to claim 10, comprising the following steps:
    A. Acquiring data based on an output of one or more camera and/or non-camera sensor(s); and
    C. Detecting whether the acquired data comprises unusual data; and
    step D is carried out only if it has been detected at step C that the acquired data comprises unusual data.

13. A classification method according to claim 12, in the case where the acquired data comprises one or more acquired image(s),
    further comprising a step B:
    B) generating at least one data sub-image based on the acquired data; and wherein
    at step C, the unusual data is detected in the at least one data sub-image.

14. A classification method according to claim 13, wherein at step D, the sample is classified by classifying the at least one data sub-image.

15. A system comprising one or more processors and a memory, the memory storing instructions which, when executed by the one or more processors, cause the one or more processors to train a classifier with a training method according to claim 1.

16. A non-transitory computer-readable recording medium including instructions of a computer program which is suitable for being performed on one or more processors, the program including instructions adapted to perform the steps of a method according to claim 1 when it is run on the one or more processors.

17. A system comprising one or more processors and a memory, the memory storing instructions which, when executed by the one or more processors, cause the one or more processors to classify a sample with a classification method according to claim 10.

18. A computer-implemented training method for training a classifier ($\Phi\eta$), wherein:
    a transformed sample being a sample obtained by applying a transformation (T) to a source sample, where the source sample is a datum of a source dataset (SD);
    the training method comprises:
    S10) training a pretext model ($\Phi\Theta$) to learn a pretext task, based on a source dataset (SD), by using a first training criterion which tends to minimize, across the source samples of the source dataset, a distance between an output of a source sample via the pretext model ($\Phi\Theta$) and an output of a corresponding transformed sample via the pretext model ($\Phi\Theta$);
    S20) for at least one sample among the samples (Xi) of the source dataset (SD), determining a neighborhood (NXi) of the at least one sample;
    wherein for the at least one sample, the neighborhood (NXi) of the at least one sample comprises K closest neighbors of the sample, K being an integer, K>=1, the K closest neighbors of the sample being K samples Xj of the dataset having smallest distances between $\Phi\Theta(Xi)$ and $\Phi\Theta(Xj)$;
    S30) training the classifier $\Phi\eta$ to predict respective estimated probabilities $\Phi\eta j(Xi)$, j=1 . . . C, for a sample to belong to respective clusters (Cj), by using a second training criterion which:
    tends to maximize a likelihood for a sample and a neighbor (Xj) of the sample belonging to the neighborhood (NXi) of the sample to belong to the same cluster; and
    tends to force the samples to be distributed over a plurality of clusters;
    the second training criterion includes a summation:

$$\sum_{c \in C} g(\Phi\eta'^c) \text{ with } \Phi\eta'^c = \frac{1}{|D|}\Sigma_{X \in D}\Phi\eta^c(X)$$

where
    c is an index of a coordinate of a prediction $\Phi\eta(Xi)$ outputted by the classifier $\Phi\eta$, and C is a set comprising all c indices;
    g is a function which measures a distance between a distribution of the predictions across clusters and a desired distribution of the predictions;
    D is a dataset used for training the classifier at step S30; and
    |D| is the number of samples in the dataset.

19. The training method according to claim 18, wherein the function g is defined by:

$$g(\Phi\eta'^C) = \Phi\eta'^C \log \Phi\eta'^C.$$

20. A computer-implemented training method for training a classifier ($\Phi\eta$), wherein:
    a transformed sample being a sample obtained by applying a transformation (T) to a source sample, where the source sample is a datum of a source dataset (SD);
    the training method comprises:
    S10) training a pretext model ($\Phi\Theta$) to learn a pretext task, based on a source dataset (SD), by using a first training criterion which tends to minimize, across the source samples of the source dataset, a distance between an output of a source sample via the pretext model ($\Phi\Theta$) and an output of a corresponding transformed sample via the pretext model ($\Phi\Theta$);
    S20) for at least one sample among the samples (Xi) of the source dataset (SD), determining a neighborhood (NXi) of the at least one sample;

wherein for the at least one sample, the neighborhood (NXi) of the at least one sample comprises K closest neighbors of the sample, K being an integer, K>=1, the K closest neighbors of the sample being K samples Xj of the dataset having smallest distances between $\Phi\Theta(Xi)$ and $\Phi\Theta(Xj)$;

S30) training the classifier $\Phi\eta$ to predict respective estimated probabilities $\Phi\eta j(Xi)$, j=1 ... C, for a sample to belong to respective clusters (Cj), by using a second training criterion which:

tends to maximize a likelihood for a sample and a neighbor (Xj) of the sample belonging to the neighborhood (NXi) of the sample to belong to the same cluster; and tends to force the samples to be distributed over a plurality of clusters: and executing at least one time a fine-tuning step S40:

S40) training the classifier ($\Phi\eta$) based on a third training criterion ($\Lambda$), the third training criterion being configured to maximize, for each considered sample (Xi) among high-confidence samples ($X^{hc}i$) whose highest probability ($\Phi\eta^{max}(Xi)$) is above a predetermined threshold (Thr), a probability ($\Phi\eta^j)(Xi)$) for the considered sample to belong to the cluster (Cj) indicated by a maximum coordinate ($\Phi\eta^{max}(Xi)$) of the prediction ($\Phi\eta^{max}(Xi)$) for the considered sample (Xi).

* * * * *